United States Patent [19]

Burstein et al.

[11] 4,245,158
[45] Jan. 13, 1981

[54] SOFT X-RAY SPECTROMETRIC IMAGING SYSTEM

[75] Inventors: Paul Burstein, Arlington; Allen S. Krieger, Lexington, both of Mass.

[73] Assignee: American Science and Engineering, Inc., Cambridge, Mass.

[21] Appl. No.: 23,914

[22] Filed: Mar. 26, 1979

[51] Int. Cl.$^3$ .............................................. G01T 1/22
[52] U.S. Cl. ................................................. 250/370
[58] Field of Search .............. 250/370, 369, 371, 388; 358/111, 213; 357/24, 29

[56] References Cited

U.S. PATENT DOCUMENTS

| | | | |
|---|---|---|---|
| 3,979,604 | 9/1976 | Bate | 250/370 |
| 3,983,395 | 9/1976 | Kim | 250/370 |
| 4,085,327 | 4/1978 | Swank et al. | 250/370 |
| 4,100,672 | 7/1978 | King et al. | 250/370 |
| 4,129,887 | 12/1978 | Michon | 250/370 |

OTHER PUBLICATIONS

IEEE Transactions on Nuclear Science, vol. NS 25, No. 1, Feb. 1978, pp. 445-452.

*Primary Examiner*—Davis L. Willis
*Attorney, Agent, or Firm*—Pollock, Vande Sande and Priddy

[57] ABSTRACT

An apparatus for simultaneously obtaining both non-dispersive and spatially-resolved soft x-ray spectra from a distributed soft x-ray source. A charge coupled device (CCD) camera having a back-illuminated CCD is irradiated by an x-ray source and a mechanical shutter or electronic shutter effect is used to define an integration period for the pixels of the CCD that ensures that the probability of a single pixel receiving more than one photon during the integration period is small. The magnitude of the charge at each pixel over an integration period is stored in a memory device and, after a plurality of integration periods have passed, the stored data for each pixel may be individually analyzed or combined and displayed to image the x-ray source.

12 Claims, 1 Drawing Figure

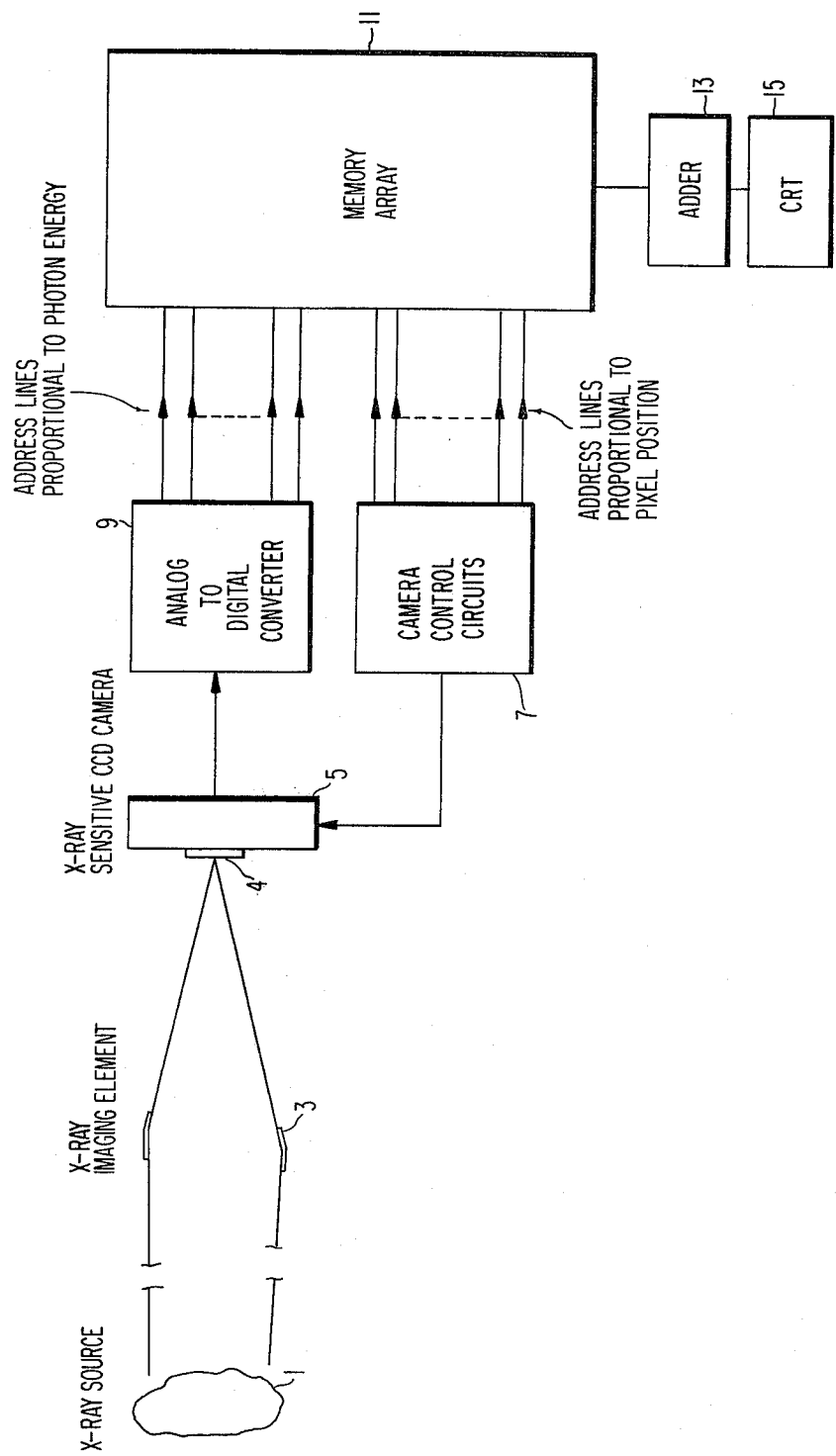

SOFT X-RAY SPECTROMETRIC IMAGING SYSTEM

BACKGROUND OF THE INVENTION

The invention relates to a soft x-ray spectrometric imaging system and, more particularly to such a system employing a charge coupled device (CCD) for measuring the energies of single photons incident upon the elements of the CCD array.

In the past, soft x-ray spectroscopy and soft x-ray imaging have been regarded as mutually incompatible endeavors. The detection systems used to reproduce soft x-ray images or to record soft x-ray spectra have been different from one another and have been unable to perform both tasks simultaneously. Soft x-ray images have been obtained by detector arrays, each picture element (pixel) of which is sensitive to either the total energy falling upon it, or the total number of photons incident upon it. Examples of such images detectors are photographic film and microchannel plate arrays.

Soft x-ray spectroscopy has involved the use of either wavelength dispersive crystal or grating spectrometers, or non-dispersive energy sensitive photon counters, e.g., gas proportional counters or solid state detectors. None of these spectrometers has been capable of distinguishing between spectra of adjacent sources. In order to obtain the spectra of N adjacent sources, N consecutive measurements, one of each source, had to be made. This was a time consuming process. Often, the character of the spectra changed in a time interval which is short compared to the time required to make the measurements.

Recently, a class of gas proportional counters capable of some position discrimination has become available. These systems are extremely limited, however, in their spatial and spectral resolution capabilities. Of critical importance is the fact that no more than one photon may be incident upon the entire proportional counter during the interval within which the photon is processed. Thus, either one must accept an extremely slow rate of acquisition of data or one must design a cumbersome system consisting of very many independent subunits. This state of affairs is unsatisfactory for applications in which the spectra of thousands of adjacent fields must be obtained simultaneously in a short time.

Accordingly, it is a primary object of the invention to provide a spectrometric imaging system for simultaneously measuring the spectra of a plurality of adjacent radiation fields.

A further object of the invention is to measure the energies of individual photons emitted from the plurality of adjacent radiation fields.

Another object of the invention is to provide a means for measuring the energies of individual photons from adjacent radiation fields of a radiation source and imaging the source.

These and other objects of the invention will become apparent from a review of the detailed specification which follows and a consideration of the accompanying drawings.

BRIEF SUMMARY OF THE INVENTION

In order to achieve the objects of the invention and to overcome the problems of the prior art, the soft x-ray spectrometric imaging apparatus, according to the invention, includes a CCD camera having a back-illuminated CCD device for receiving incident x-ray photons at picture elements (pixels) of a CCD array and generating corresponding electrical charges.

The CCD camera is operated by a camera control circuit to define an integration period for the pixels of the CCD that is sufficiently short to ensure that the probability of a single pixel receiving more than one x-ray photon during the integration period is small. For each integration period, the camera control circuit operates to gate the charges at the pixels to an analog to digital converter that converts each charge to a corresponding digital representation. The control circuit then operates to store the digital representation of charge for each pixel at an address in a memory corresponding to the position of the pixel in the CCD array.

The stored data obtained over several integration periods may be combined for each pixel to provide an indication of the total flux received by each pixel and the combined data may be displayed on a CRT to image the x-ray source.

BRIEF DESCRIPTION OF THE DRAWING

The drawing illustrates a block diagram of a preferred embodiment of an x-ray spectrometric imaging system according to the invention.

DETAILED DESCRIPTION OF THE PREFERRED EMBODIMENT

The remaining portion of the specification will describe preferred embodiments of the invention when read in conjunction with the attached drawings, in which like reference characters identify identical apparatus.

FIG. 1 illustrates a block diagram of a preferred embodiment of a soft x-ray spectrometric imaging system according to the invention. More particularly, in the system of FIG. 1, an x-ray source 1 irradiates an image forming device 3, for example a simple pinhole camera, x-ray microscope or x-ray telescope. The device 3 directs the incident x-rays to a charge coupled device (CCD) camera 5 utilizing a back-illuminated silicon CCD.

The CCD of the camera has an array of x-ray sensing elements (pixels), each pixel acting as a solid-state photodetector that generates an electrical charge that is proportional to the total energy of the x-ray photons incident upon the pixel. Thus, a pixel will generate an electrical charge that corresponds to the sum of the energies of all of the photons incident upon the pixel during an integration period.

An integration period for a pixel of the CCD is defined as the time interval during which photon-induced charge is allowed to build up at the pixel. The integration time for a pixel may be controlled by controlling the rate at which the charge at the pixel is gated from the CCD. For example, if the gating frequency is increased, the corresponding integration interval for the pixel is decreased. Alternatively, the integration period for a pixel may be controlled by operating a shutter between the radiation source and the CCD to time the exposure of a pixel of the CCD to incident photons.

It should be understood that if only one x-ray photon is known to have interacted in a pixel of the CCD array, the electrical charge in that pixel will correspond to the energy of the single incident photon. It has been shown in a publication, Burstein, P. H., Krieger, A. S., Vanderhill, M. J. and Wattson, R. B., "Soft X-Ray Imaging Experiments with Charge Coupled Devices (CCD's)

and Some Astronomical Applications", SPIE 143, 114 (Mar. 28, 1978), that the pixels of a CCD device may be used to measure the energy of single photons if the integration period for the pixels of the CCD is defined so that the probability of a single pixel receiving more than one photon during the integration period is small.

Thus, single soft x-ray photons having energies in the range of 100 to 2000 ev may be detected directly by known CCD devices, provided that the intrinsic noise levels (dark current and readout noise) of such devices is low compared to the signal that is produced by the single soft x-ray photon. A back-illuminated CCD is operated at a low temperature in a preferred embodiment of the invention in order to reduce the intrinsic noise of each pixel of the CCD to a level that is lower than the charge that is produced by a single x-ray photon having the minimum desired energy.

Individual having low energies, for example photons of visible light, do not liberate a sufficient charge in known CCD devices to be detectable over the intrinsic noise. However, it should be appreciated that the limitations of currently available photon detection devices do not limit the scope of the invention.

If only one x-ray photon is known to have interacted in a pixel of a CCD array, the charge in that pixel will be a function of the photon energy, as in a solid state detector. Thus, each pixel will have an energy-to-charge transfer curve associated with it, and hence an energy resolution curve. If all pixels of the array have a similar type of response, the CCD may be used as a non-dispersive x-ray spectrometer. It is noted that the energy resolution of such a CCD is superior to that of a prior art non-dispersive spectroscopic device such as a gas proportional counter.

CCDs in general have many pixels in an array. Values for numbers of pixels vary from hundreds to hundreds of thousands per device for various commercially available devices. Because the pixels of a CCD collect data simultaneously, there is a corresponding multiplex advantage over a conventional single detector non-dispersive spectrometer or an imaging proportional counter.

Thus, the CCD is well suited for use as an energy analyzer for events which occur over very short time scales. In general, any x-ray phenomena can be measured with good spectral resolution if the time scale for measurement is less than one integration period of the associated CCD. Such an approach is particularly effective for events having time scales in the tens of nanoseconds, or faster.

As indicated above, the CCD of the camera 5 is placed in the focal plane of an x-ray imaging device and is exposed to radiation for a controlled integration period, the length of the period being determined by the requirement that there be a low probability of more than one photon interacting in any pixel of the CCD.

More particularly, a camera control circuit is employed to define the integration period for the pixels of the CCD, for example by operating a shutter 4 of the camera 5 to interrupt the passage of photons at a rate that is sufficient to substantially reduce the probability of a single pixel receiving more than one photon during the period that the shutter is open. After each opening of the shutter to pass photons, the camera control circuit operates in a manner known to the art to gate the charges in the pixels of the CCD array out of the array. The gated charges are then applied to an analog to digital converter 9 that generates a digital number for each pixel. Each number is proportional to the charge that was produced in the associated pixel. The control circuit operates to store a digital representation of the charge for each pixel of the array in a memory 11 at an address corresponding to the position of the pixel in the CCD array.

Thus, for each integration period, the CCD memory 11, for example an array of digital counting elements, receives for each pixel an address for accessing a particular memory area associated with the pixel and an associated digital number corresponding to the photon energy that was measured at the pixel. The energy information for each pixel may be stored in the memory 11 in accordance with any information storage scheme known to the art.

For example, a number n of energy channels of interest could be determined and a memory storage location could be provided for each channel of each pixel of the CCD. Thus, each CCD pixel would be allocated n memory locations, corresponding to the n energy levels that could be measured at the pixel. More particularly, if the CCD array has $100 \times 100$ pixels and the incident photon spectrum is split into ten distinct energy channels, $10^5$ memory locations will be allocated. Of course, each memory location will be capable of storing a number corresponding to the maximum number of integration periods required for making the source energy measurement. Therefore, after a source energy measurement is made, each of the n memory locations of a pixel will have a stored number corresponding to the number of photons of the indicated energy that were measured at the pixel.

In accordance with the invention, after a series of CCD readouts is made, the memory 11 contains data that is representative of the x-ray energy spectrum that is associated with the spatial conjugate of each pixel of the CCD. Thus, the spectrum at points on the x-ray source can be determined and one spectrum can be compared with another. Alternatively, the separate energy channel data for each CCD pixel can be added, for example by an adder 13 and the total flux received by each pixel can be determined in much the same manner as is currently done with other x-ray image detection techniques. The total flux information for the x-ray source can then be displayed in a manner known to the art, for example on a CRT 15.

If a mechanical shutter 4 is used to define the integration period of the CCD, a minimum integration interval is necessarily determined by the maximum speed at which the shutter may be operated. Such a minimum integration interval is, generally, not fast enough to provide a reasonably low probability of receiving more than one photon at a pixel when a high intensity x-ray source having closely spaced photons is used.

Accordingly, a faster "electronic shutter" effect may be employed to further decrease the minimum integration interval for the CCD and to thereby provide a means for sampling single photons from x-ray sources of relatively greater intensity. Greatly reduced integration intervals may be obtained by utilizing the camera control circuit to rapidly gate the photon-induced charge from the pixel of the CCD array. It should be appreciated that as the gating speed of the pixel charges is increased, the integration interval for accumulating a charge on a pixel is correspondingly reduced.

However, fast gating of the CCD may not be sufficient to discriminate individual photons for high intensity, broad spectrum x-ray sources. It may be necessary to place a filter between such sources and the CCD camera to pass only photons having energies in a particular range of interest. Such a filtering will reduce the number of incident photons per unit of time and will, therefore, allow the apparatus of the invention to measure the energy of individual photons within the energy range.

In order for a soft x-ray to penetrate to the sensitive region of a pixel of the CCD, there must be a minimum of intervening dead layer. In conventional, mass-marketed area CCDs, the electrodes and the transfer circuitry are on the front-side of the chip. This circuitry is made of visibly transparent (i.e., for visible light) material. In normal visible light operation, the CCD is illuminated from the front side, the photons pass through the electrodes and various other circuitry and interact in the charge collection region of the pixel. For soft x-rays, however, the intervening layers are not at all transparent; with a thickness of 1 $\mu$m or more, they are optically thick, especially in the subkilovolt energy range.

If the charge collection region of a pixel extends all the way to the back side of the CCD, then the back side should be sensitive to any radiation falling upon it. Conventional area array CCDs are much too thick ($\sim 100$ $\mu$m) for the charge collection fields to penetrate to the back side. However, recent developments by RCA, as reported in Cheng, et al: "Intensified CCD Readout System for Ultrafast Streak Cameras", *J. Applied Physics* (1978) and Texas Instruments, Root, G.: "Testing Thinned, Backside Illuminated CCD Area Image Sensors", Proceedings of the Conference on Charge-Coupled Device Technology and Applications, *JPL* SP 43-30, pg. 63 (1976), have resulted in chips which can be thinned. With the reduced thickness the effective charge collection field extends all the way to the back side of the chip. Thus, the back side is, in theory, sensitive to any radiation falling upon it. In practice, there is a relatively thin ($\sim 0.1$ $\mu$m) dead layer of passivating material through which the radiation must pass.

An existing Texas Instrument's device (500×500) is better suited for the single photon detection mode because it is a buried channel device and hence less prone to the noise problems that are associated with a corresponding surface channel device SID 52501, which is made by RCA. However, it will be appreciated by those skilled in the art that if an all-buried channel device is thinned, the device will, theoretically, yield better noise performance than the surface channel device.

The CCD camera 5 must be of low noise character. The correlated double sampling technique which gives a zero reference to the AC output component of the video is one electronic technique which helps improve the noise performance. This and other low noise techniques are well-known and have been discussed previously, for example in Scinicariello, F.: "Low Noise Video Amplifier for Imaging CCDs", Proc. of Conference on Charge-Coupled Device Technology and Applications, *JPL* SP 43-40, pg. 83 (1976).

However, as indicated above, the most effective means of reducing the effect of noise is by cooling the CCD. The noise changes by a factor of 2 for approximately every 7 Celsius degrees difference in temperature. Buried channel devices have been operated at temperatures as low as 77° Kelvin. State-of-the-art cameras having rms readout rates of $\sim 15$ electrons can easily discriminate a single x-ray photon (e.g., a photon of energy 500 eV, at an average of $\sim 3.6$ eV/electron would generate 139 electrons). Assuming 50 percent collection efficiency, an average of $\simeq 84$ electrons would be found at the output, an average of 69 of which would be due to the photon and an average of $\simeq 15$ due to the readout noise. The energy resolution $\Delta E_{FWHM}/E$ is about 30 percent where $\Delta E_{FWHM}$ is the full-width half maximum of the distribution and E is the mean measured energy.

The RCA surface channel device SID 52501 does not respond well when cooled below 0° C., and it is unclear whether the device will be able to function well as a spectrum analyzer in the soft x-ray range. An experimental RCA buried channel device, however, has been successfully operated at temperatures below −60° C., and the thinned buried channel device promises to be a good x-ray spectral imaging element.

As indicated above, the method by which single photons are differentiated at a pixel is entirely dependent upon the extent and intensity of the imaged radiation pattern. For a relatively weak x-ray source, a mechanical shutter which interrupts the x-rays may be sufficient. This would work with all kinds of CCD internal architecture, whether frame transfer or interline transfer. For relatively short exposures, the frame transfer, such as is used in the RCA device, is preferable. Here the image can be recorded in the imaging area of the device and shifted into the storage area in a time that is short compared to the time used for any mechanical shutter operation. For the RCA chip, this speed is a factor of 256 longer than the vertical clock period. There already exist a number of schemes for varying the readout rate of a camera, for example as provided for the RCA chip in Louie, Anthony et al: "The EOP- A CCD Based Electro-Optical Processor", Proceedings of the 1978 Conference on the Applications of Charge-Coupled Detectors, San Diego, pg. 3A-33 (October, 1978).

Similar variable rate scan cameras have been designed and used in other experiments, for example as reported in Melen and Buss, "Charge-Coupled Devices: Technology and Applications", IEEE Proceedings, New York (1977). Of course, as indicated above, a scan which is fast relative to the exposure time acts as an electronic shutter.

In principle, the imaging spectrometer, according to the invention, need not be limited to detecting x-rays, but could be used for any radiations where the signal is sufficiently above background to be recognizable as a signal, the number of electrons produced is large enough to give a relative statistical spread that is small enough to be useful (i.e., sufficient energy resolution for the particular application), and the detector is a reasonably efficient detector of the photons in question. The first two conditions limit the response at the low energy end of the spectral range while the last condition becomes the limiting factor at the high energy end. The most effective energy range for existing devices is $\simeq 100$ eV to $\simeq 10$ keV. If an existing CCD were optically thick for harder x-rays or even gamma rays, then the corresponding photons could be detected in accordance with the invention.

It should be understood that the memory scheme shown in the figure is practical for ground-based instrumentation, but may not be practical for space applications where the memory access shown would be cumbersome. A more practical scheme would involve the use of a gate between the A/D converter and the memory array. Thus, only positive non-zero data would be processed. In addition, it should be appreciated that the address lines leading to the memory array are not necessarily physically separate; there exist well-known methods for accessing the memory array from the controlling circuitry.

As explained previously, for a preferred embodiment of the invention, the probability of a single pixel of the CCD receiving more than one photon during an integration interval must be small in order to effectively differentiate individual photons. As a practical matter, a small probability of 1% or less of multiple photon interaction at a pixel would, generally, produce photon energy measurements of reasonable accuracy. However, it should be appreciated that the invention is not limited to a particular probability range, since the degree of accuracy of a measurement is purely a matter of choice that depends upon the level of error that can be tolerated for the measurement.

The invention may be embodied in other specific forms without departing from its spirit or essential characteristics. The present embodiments are, therefore, to be considered in all respects as illustrative but not restrictive, the scope of the invention being indicated by the claims rather than by the foregoing description, and all changes which come within the meaning and range of the equivalents of the claims are therefore intended to be embraced therein.

What is claimed is:

1. Apparatus for measuring the energy of single photons of radiation emitted by at least one radiation source, comprising:
   a solid state array having a plurality of sensing elements, each element for receiving an incident photon of radiation over an integration period and generating a corresponding signal proportional to the energy of the incident photon;
   control means for defining said integration period sufficiently small to provide an acceptably high probability that a sensing element will receive not more than one photon during said integration period; and
   memory means for storing a representation of the photon energy measured at each sensing element over at least one of said integration periods.

2. The apparatus of claim 1 further comprising display means for combining for each sensing element the energy measurements at the sensing element over a plurality of integration periods to define the total flux received for each element over the plurality of integration periods, and displaying the total flux values to image said at least one radiation source.

3. The apparatus of claim 1 wherein said solid state array is a charge coupled device oriented to receive the incident photons of radiation by back-illumination.

4. The apparatus of claim 3 including means for operating said charge coupled device at a reduced temperature to reduce the effects of intrinsic noise on the photon energy measurements.

5. The apparatus of claim 1 including converter means for generating a digital data signal for each value of photon energy measured during an integration period.

6. The apparatus of claim 5 wherein said control means includes means for generating an address signal for each of said digital data signals, the address signal identifying the sensing element at which the photon energy corresponding to the data signal was measured, and means for applying each address signal to access a particular memory area in said memory means and applying said data signal to increment a memory location in the accessed memory area corresponding to an energy channel within which the measured photon energy falls.

7. The apparatus of claim 1 wherein said control means includes means for gating the signals from the sensing elements of said solid state array at a rate that is sufficiently rapid to provide an acceptably high probability that a sensing element will receive not more than one photon during said integration period.

8. The apparatus of claim 1 including means for forming an image of said at least one radiation source on the sensing elements of said solid state array.

9. The apparatus of claim 1 wherein the radiation from said at least one source is x-radiation.

10. The apparatus of claim 1 wherein the radiation from said at least one source is x-radiation having photons in the energy range of 0.1 keV to 10 keV.

11. The apparatus of claim 1 including a filter disposed between said at least one radiation source and said solid state array for passing photons having energies that fall within a particular energy range.

12. The apparatus of claim 1 including a shutter disposed between said radiation source and said solid state array for operating at a sufficiently rapid rate to interrupt the flow of photons to said solid state array in a manner to provide an acceptably high probability that a sensing element of the array will receive not more than one photon during said integration period.

* * * * *